(12) United States Patent
Benmimoun et al.

(10) Patent No.: US 12,146,754 B2
(45) Date of Patent: Nov. 19, 2024

(54) USER TRAINED MAP FOR VALET PARKING FEATURE

(71) Applicant: Ford Global Technologies, LLC, Dearborn, MI (US)

(72) Inventors: Ahmed Benmimoun, Aachen/NRW (DE); Chenhao Ma, Canton, MI (US); Tony Tae-Jin Pak, Garden City, MI (US); Hamid M. Golgiri, Livonia, MI (US); Thomas Edward Pilutti, Ann Arbor, MI (US); John Michael Celli, Westland, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 352 days.

(21) Appl. No.: 17/582,125

(22) Filed: Jan. 24, 2022

(65) Prior Publication Data

US 2022/0299329 A1  Sep. 22, 2022

(30) Foreign Application Priority Data

Mar. 19, 2021  (EP) ..................... 21163761

(51) Int. Cl.
*G01C 21/34* (2006.01)
*B62D 15/02* (2006.01)
(Continued)

(52) U.S. Cl.
CPC ....... *G01C 21/3476* (2013.01); *B62D 15/027* (2013.01); *G01C 21/3438* (2013.01);
(Continued)

(58) Field of Classification Search
CPC ............ G01C 21/3476; G01C 21/3438; G01C 21/3811; G01C 21/3837; B62D 15/027;
(Continued)

(56) References Cited

U.S. PATENT DOCUMENTS 10,650,680 B2    5/2020  Penna et al.
2017/0253237 A1  9/2017  Diessner
(Continued)

FOREIGN PATENT DOCUMENTS

DE  102017120726 A1 *  3/2019
EP     3705385 A1       9/2020
(Continued)

OTHER PUBLICATIONS

EP Search Report dated Jul. 23, 2021.
Chirca et al., "Autonomous Valet Parking System Architecture", Certified by IEEE PDFeXpress at Jun. 25, 2015.

*Primary Examiner* — Anne Marie Antonucci
*Assistant Examiner* — Jewel Ashley Kuntz
(74) *Attorney, Agent, or Firm* — Frank A. MacKenzie; Bejin Bieneman PLC

(57) ABSTRACT

A user trained map for providing driver assistance in a vehicle is obtained by entering a training mode, acquiring and at least temporarily storing vehicle sensor data related to the vehicle's position during training mode while the vehicle is operating in training mode, generating and storing a trained digital map of a parking route at least partially based on the acquired vehicle sensor data, acquiring and storing position information related to a drop-off location and to a pickup location, the drop-off location and the pickup location being part of the parking route, and exiting the training mode.

20 Claims, 2 Drawing Sheets

(51) Int. Cl.
*G01C 21/00* (2006.01)
*G08G 1/16* (2006.01)

(52) U.S. Cl.
CPC ...... *G01C 21/3811* (2020.08); *G01C 21/3837* (2020.08); *G08G 1/168* (2013.01)

(58) Field of Classification Search
CPC .... B62D 15/0285; G08G 1/168; G08G 1/143; G08G 1/0969; G08G 1/096805; G08G 1/14; G05D 1/0221
See application file for complete search history.

(56) References Cited

U.S. PATENT DOCUMENTS

| | | | |
|---|---|---|---|
| 2019/0135275 A1 | 5/2019 | Park | |
| 2019/0176813 A1 | 6/2019 | Yamada | |
| 2020/0278688 A1* | 9/2020 | Sarkar | G01C 21/3685 |

FOREIGN PATENT DOCUMENTS

| | | | |
|---|---|---|---|
| JP | 2019109823 A * | 7/2019 | |
| WO | 2018127365 A1 | 7/2018 | |
| WO | WO-2018162459 A1 * | 9/2018 | |
| WO | 2020212242 A1 | 10/2020 | |

* cited by examiner

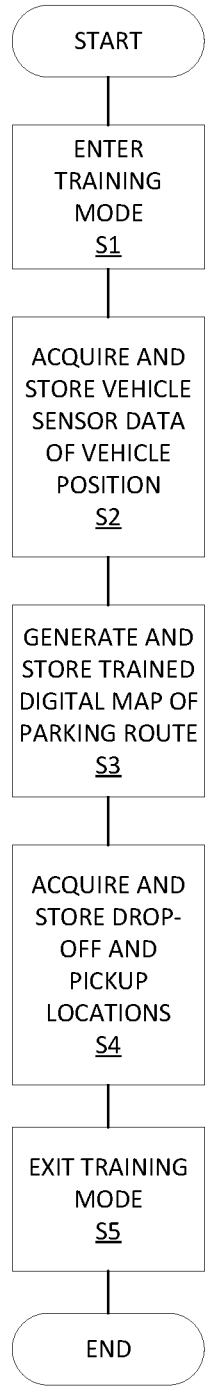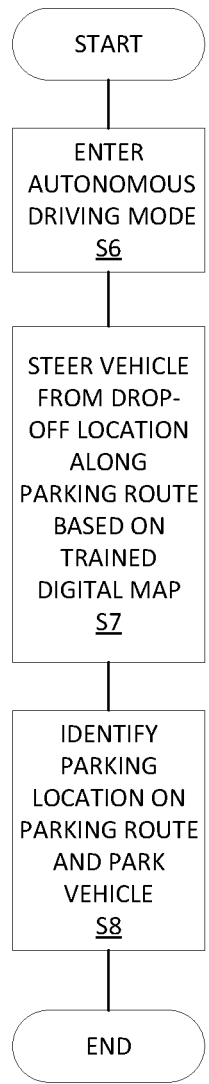
FIG. 2
FIG. 3
FIG. 4

USER TRAINED MAP FOR VALET PARKING FEATURE

CROSS-REFERENCE TO RELATED APPLICATION

This patent application claims priority to European Application No. EP 21163761.6 filed Mar. 19, 2021, which is hereby incorporated by reference in its entirety.

BACKGROUND

Advanced driver-assistance systems in vehicles including Valet Parking Assistance (VaPA) provide fully automated steering and manoeuvring when parking, for example within a car park or parking structure. Such systems use automated vehicle controls, along with camera, Lidar, radar, GPS (Global Positioning System), proximity and ultrasonic sensors, to navigate, identify valid parking slots, and park the vehicle ("drop-off" manoeuvre). The feature is also able to autonomously drive the parked vehicle from a parking slot to a specified pickup location ("summon" manoeuvre) upon request by the user.

Such ADAS require the area where it is applied to be mapped for the vehicle to plan a route for the drop-off and summon manoeuvre. This digital map of the area, for example a car park or parking structure, could be very simple and consist only of a description of the drivable sections, or more complex such as high-definition maps with additional attributes such as signs, lane widths and the like.

When the vehicle is used on terrain for which no digital map is available at all, or when the available digital map data is not reliable or up to date, current ADAS do not provide the VaPA functionality, and the user might not be able to use it in areas where they would like to.

BRIEF DESCRIPTION OF THE DRAWINGS

FIG. 2 shows an example flowchart of an implementation of a training mode.

FIG. 3 shows an example flowchart of an implementation of a valet parking feature.

FIG. 4 shows another example flowchart of an implementation of a valet parking feature.

DETAILED DESCRIPTION

Figure 1:
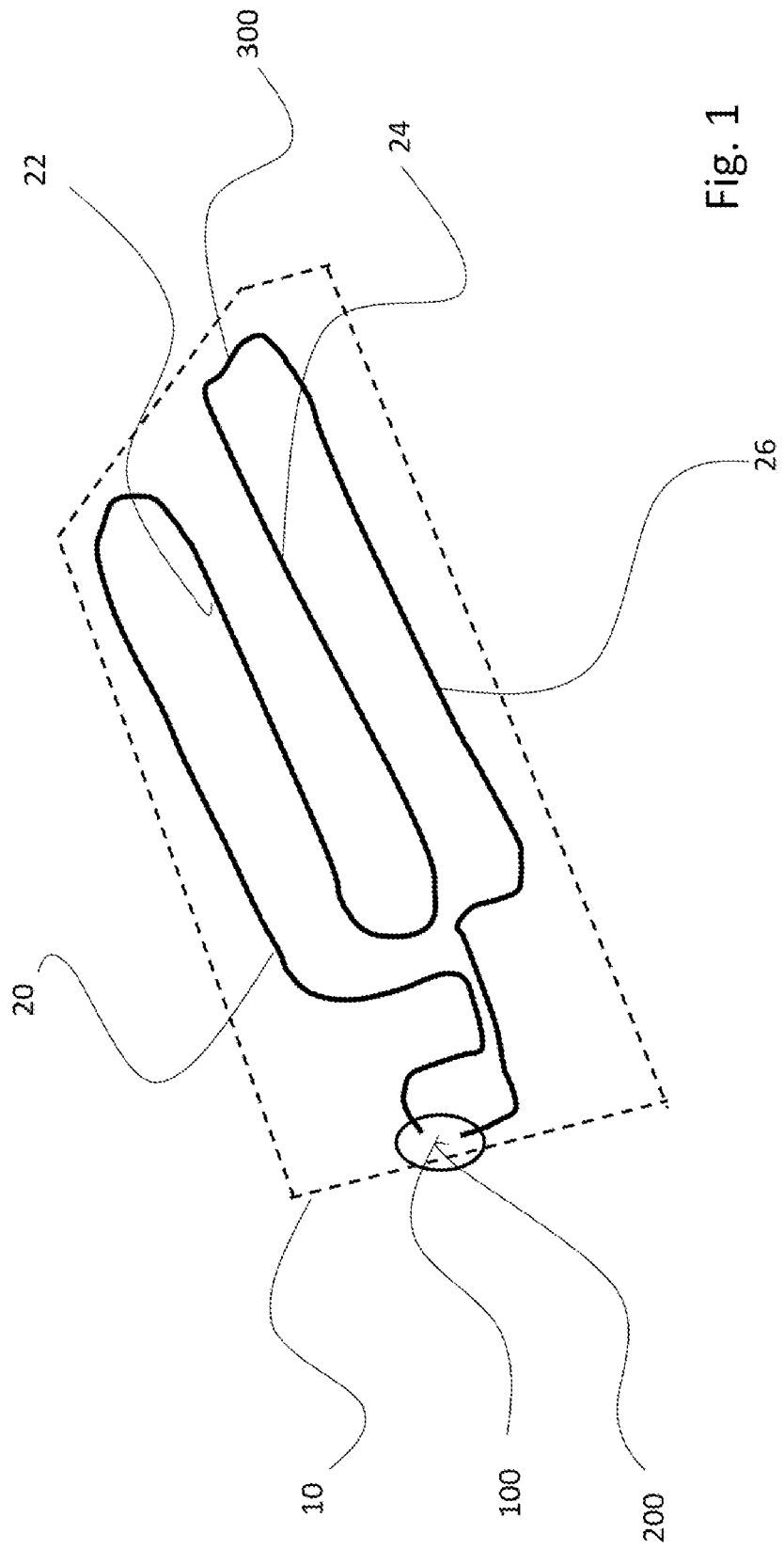
FIG. 1 shows a schematic example of an implementation of the inventive concepts.

It is an object of the invention to provide an alternative method of providing driver assistance.

It is a further object of the present disclosure to provide a corresponding advanced driver-assistance system (ADAS) and autonomous driving system, and a corresponding non-transitory computer-readable medium.

This object may be achieved by the method, systems, and non-transitory computer-readable medium defined in the appended claims.

According to a first implementation illustrated in FIG. 2, a method of providing a user trained map for driver assistance in a vehicle includes the steps of:

S1 entering a training mode;

S2 acquiring and at least temporarily storing vehicle sensor data related to the vehicle's position while the vehicle is operating in training mode;

S3 at least partially based on the acquired vehicle sensor data, generating and storing a trained digital map of a parking route;

S4 acquiring and storing position information related to a drop-off location and to a pickup location, the drop-off location and the pickup location being part of the parking route; and S5 exiting the training mode.

The digital map of the parking route may not only include the route as such, but also parking slots.

The method differs from conventional VaPA methods identified in the above. With the inventive method, when the user wants to use VaPA in a non-mapped area the system will propose to do a training loop first. For this purpose, the driving assist system enters training mode and, in embodiments of the invention, the user drives manually through the parking area and defines the parking route that the vehicle will use for automated drop-off and summon manoeuvres. In alternative embodiments, the user is guided along the parking route at least partially on the basis of digital map information that is already available, which will be discussed in more detail further below.

It is an advantage of the present disclosure that the trained digital map is created specifically with the intention to use it for VaPA instead of randomly collecting data of vehicles that drive though the parking lot, as has been proposed in relation to other, technically remote applications. Using a method according to the present disclosure, the user does not need to wait until a critical mass of vehicles have driven along a parking route, for instance through a car park, before the VaPA feature is available. Immediately after training, the user can take advantage of the feature and does therefore not depend on other parties.

According to another advantageous aspect, the user can also upload the trained digital map, together with other information such as comments, to a remote computer, e.g. in the framework of a cloud solution, and make it instantly available to other users. It is also possible for the user to download an existing crowd-sourced map.

Also, in line with this advantage and in the course of generating the trained digital map, additional information and map attributes may be generated, for example using sensor data or annotations from the user. User-specific needs may be considered as well, such as drop-off and pick-up location.

In implementations, while the user drives manually, a defined data set including positions of the vehicle as well as sensor data may be logged and stored on the vehicle. This data may be processed accordingly by the ADAS and as a result a trained digital map of the parking area is generated that can be used by the VaPA feature.

In various implementations, the vehicle sensor data of step S2 can include GPS (Global Positioning System) data. GPS data is known for its high level of accuracy and compatibility with state-of-the-art digital maps.

Generally speaking, during training mode the user should follow the parking area rules, for example stop signs, one-way aisles etc. Accordingly, in implementations, when the vehicle uses the trained digital map in autonomous driving mode, the vehicle follows strictly the route driven by the user during training mode, and only deviates from it in exceptional circumstances, for example when avoiding obstacles.

In this context, it should also be mentioned that, during training mode, the driven speed ranges within a pre-defined training speed limit. Driving too fast can affect the map accuracy negatively. It can also be an indication that the user has driven the vehicle into a public road during the training session. For this purpose, if the vehicle speed is higher than the pre-defined training speed limit, the training may be cancelled and the ADAS may exit training mode. Alternatively, only the section of the route where the vehicle was too fast may be discarded and/or the user may be asked to drive through that section again.

In implementations of the present disclosure, the ADAS may be configured to reject improper driving manoeuvres. To this end, the ADAS may be configured to consistently monitor the environment of the vehicle for traffic signs such as ground signs with driving arrows, or one-way signs, and other relevant indications such as when the vehicle drives past parking slots. The monitoring can be achieved, for instance, by using corresponding on-board sensor technology of the vehicle such as cameras. The ADAS uses this information to evaluate whether the user is driving the vehicle properly. If such a situation is detected, the ADAS is configured to provide a respective alert to the driver.

In implementations of the present disclosure, if improper driving is detected, the ADAS may be configured to guide the user to return to the last location where proper driving was established, and restart the training mode from that location in order to correct the improper driving by repeating the respective part of the course driving properly. In further implementations, if the ADAS establishes that the user does not correct the improper driving, the training mode may abort, for example after a predetermined time out.

In implementations, the user may start at the drop-off location and drive the vehicle along one or more routes along the parking route, for example along all possible aisles in the parking area, and stop at the pickup location. The driving assist system may be configured to automatically assume the position at which the training mode is entered as the drop-off location, and to determine the position at which the training ends as the pickup location.

In other implementations, when the driver trains a closed loop, the start position for training may not need to match with the drop-off and pickup location. The user can just start anywhere on the intended route, but must make sure that the intended drop-off and pickup locations are included in the parking route. In some implementations, the intended drop-off and pickup locations can be indicated in the trained digital map as a part of postproces sing the trained digital map.

Implementations, as illustrated in FIG. 3, may comprise the steps of:
S6 entering the autonomous driving mode if an autonomous driving mode has not already been entered;
S7 in the autonomous driving mode, steering the vehicle from the drop-off location along the parking route, at least partially based on the trained digital map; and
S8 identifying a parking location on the parking route, and parking the vehicle in the parking location.

Herein, identifying the parking location can comprise identifying the parking location at least partially based on vehicle sensor data, the vehicle sensor data comprising at least one of camera data, Lidar data, radar data, ultrasonic sensor data, and proximity sensor data. In other embodiments, the parking location can be determined by a user, for example in the trained digital map and/or by entering positional data int the ADAS, such as GPS data.

To prompt the driving assist system to carry out steps 6 and/or step 7, implementations of the present disclosure may include the step of acquiring instructions from a user to park the vehicle.

In an implementation, as illustrated in FIG. 4, the method may include the steps of
S9 entering the autonomous driving mode if an autonomous driving mode has not already been entered; and
S10 in the autonomous driving mode, steering the vehicle to the pickup location, at least partially based on the trained digital map.

These steps may be prompted by respective instructions from a user to move the vehicle from the parking location to the pickup location.

Implementations may further include the steps of:
at least partially based on vehicle sensor data, establishing or determining that the vehicle enters a car park;
determining whether digital map information of the car park is available; and
proposing to a user of the vehicle enter the training mode to carry out steps S1 to S5.

Upon confirmation by the user, this may invoke steps S1 to S5 described above.

In some instances, digital map information of otherwise sparsely digitalised areas such as car parks can be derived from certain providers such as open street maps (OpenStreetMap.org). In these cases, once it is established that digital map information of the car park is available, implementation may include the step of, in training mode, guiding the user of the vehicle along the parking route, for example through the aisles of the car park, at least partially based on the digital map information. In such instances, the vehicle can also take over lateral and longitudinal controls as long as the user remains engaged and ready to take over quickly ("L2 training manoeuvre").

Advantageously, these implementations allow for a comparison between the already available digital map information and the trained digital map, to confirm that the digital map information is correct and to thereby increase reliability and robustness of the autonomous navigation.

Implementations may also include post-processing of the trained digital map, wherein post-processing includes refining the trained digital map using additional vehicle sensor data and/or external digital map data, the vehicle sensor data comprising at least one of camera data, Lidar data, radar data, ultrasonic sensor data, and proximity sensor data.

It has been found that such additional vehicle sensor data can improve the accuracy of the trained digital map. For example, cameras can determine aisle boundaries in a car park and use these to correct for errors in the position of the vehicle or driven path. This is particularly useful in cases where the user does not drive straight.

In some instances, for example in case of indoor parking structures, GPS may not be available. For this purpose, in some implementations, a SLAM (Simultaneous Localization and Mapping)-based approach may be used when conducting the training mode. Using the onboard vehicle sensors such as camera, Lidar, radar etc., car park specific features can be identified and stored in the trained digital map. During a VaPA manoeuvre, the vehicle can then re-detect these features and compare them to those in the trained digital map. By doing so, the vehicle position can be determined without GPS data.

Because the user needs to focus on his driving task during training mode, they will not typically be able to provide significant annotations to the trained digital map during this phase. After exiting training mode, the user can do further editing of the map either in the vehicle via the user interface of the ADAS, or on an external device such as PC, smartphone, tablet, or the like, and upload the final digital map to the vehicle again.

Advantageously in cases where the user is actually able to interact with the vehicle more during training mode, implementations may allow the user to add additional information and/or attributes to the map in training mode, for example the user can mark sections of the parking route that are allowed or preferred for parking by pressing and releasing a button of the user interface of the ADAS. Additional attributes of the map encompass signs, driving direction, number of lanes, crossings, pedestrian crossings, speed bumps, and the like.

In various implementations, the user interface of the ADAS may be configured to allow the user to add the additional information via audio, i.e., using voice recognition, during training mode.

In relation to another aspect of post-processing, the method may also allow the driver to drive along the same parking route multiple times, for instance through the same aisle in a car park, if this is required to reach all the aisles of the car park. By doing so, the automated post processing may generate a map network instead of just a single parking route. In these implementations, the map network may enable the ADAS to plan better routes for both drop-off as well as summon, for example the shortest route to the pick-up location.

Similarly, in order to improve the quality of the trained digital map, in some implementations the user can train the trained digital map by driving in both directions along the parking route over sections that allow bi-directional driving.

This aspect is particularly interesting because in general terms, the user should principally drive only forward during training mode. However, due to inattention it may happen that the user has to back-up during training. In such a case, it would be annoying for the user to repeat the complete training process from start. For this reason, in an implementation, whenever a reverse motion is detected during training mode, the method may include the step of guiding the user to backup to any position on the current parking route and allow the user to continue the train map session from that position. During the post processing of the map, all sections that are driven in reverse can be removed and corrected for this unintended manoeuvre.

Implementations may also include the step of making the trained digital map available to a central server computer for sharing the trained digital map with other users.

Accordingly, if a parking route, for example a car park, has been already mapped by one or multiple users, these maps can be shared with other VaPA users without needing them to map the parking route themselves. For this purpose, it can be envisaged that the individual generated trained digital maps have to fulfil specific requirements, e.g., with a view to similarities between maps, map quality, type of maps (networks vs. route), and so forth. The sharing can either be initiated by the user or by the VaPA feature. One of several implementations of this feature includes a server-based service to organise map sharing and maintain the maps.

According to another aspect of the present disclosure, there is provided an advanced driver-assistance system (ADAS) for a vehicle, including a controller configured to
communicate with vehicle sensor apparatus to acquire vehicle sensor data, preferably GPS (Global Positioning System) data from a GPS sensor; and
communicate with a data storage device for storing and providing data such as vehicle sensor data and digital map data; and configured to carry out the method described in the above.

According to yet another aspect, the present disclosure provides an autonomous driving system for a vehicle. The autonomous driving system according to the invention includes:
vehicle sensor apparatus, comprising at least a GPS (Global Positioning System) sensor;
control and servo units configured to autonomously drive the vehicle, at least partially based on vehicle sensor data from the vehicle sensor apparatus;
a data storage device for storing and providing data;
a user interface; and
the advanced driver-assistance system described in the above.

According to another aspect of the present disclosure, there is provided a nontransitory computer-readable medium having stored thereon computer-executable instructions configured to cause the controller to perform the method described above.

The invention will now be described in more detail with reference to the appended figure. In the figure:

FIG. 1 shows a schematic example of an application of the method according to the present disclosure.

Turning to FIG. 1, area 10 designates a region that is either not digitalised for use by an ADAS at all or is likely to be insufficiently or unreliably digitalised.

In the figure, area 10 is a car park having a multitude of aisles 20, 22, 24, and 26 with corresponding parking slots.

Further in the figure, a drop-off location 100 indicates a spot where the user intends to exit the vehicle which is equipped with an Advanced driver-assistance system (ADAS). As can be seen in the figure, location 100 is remote from most of the parking slots, which is considered to be a typical situation in which the user may prefer to rely on driver assistance, in particular a Valet Parking Assistance (VaPA) feature. In the instance shown in the figure, the drop-off location 100 is identical with a pickup location 200 where the user wants to be picked up by the vehicle at a later point in time. While this may be a typical situation, for the invention to work it is not required that the drop-off location 100 and the pickup location 200 are identical.

FIG. 1 further shows a parking route 300 which in the embodiment shown is a closed loop. The parking route 300 extends through all the aisles 20, 22, 24, and 26 of the cark park indicated by area 10 and thereby maximises parking opportunities.

In order to provide the VaPA functionality in the vehicle in the hitherto not or insufficiently digitalised area 10, the method according to the invention comprises the steps of:
S1 entering a training mode;
S2 while the vehicle is operating in training mode, acquiring and at least temporarily storing vehicle sensor data related to the vehicle's position—in some embodiments of the present disclosure, this comprises acquiring and storing GPS data;
S3 at least partially based on the acquired vehicle sensor data, generating and storing a trained digital map of the parking route 300;
S4 acquiring and storing position information related to the drop-off location 100 and to the pickup location 200, the drop-off location 100 and the pickup location 200 being part of the parking route 300; and
S5 exiting the training mode.

In the embodiment shown in FIG. 1, the method can also be described in practical terms from the perspective of the user as follows.

When the user or, respectively, the user's vehicle, enters the car park indicated by area 10, which may be established by use of information available in an existing navigation map or on the basis of vehicle sensor data, for instance by a camera that picks up a respective road sign, the ADAS according to the invention will analyse if that car park is already mapped for automated Valet Parking. If that is not the case, the ADAS can propose to the user, for example via a suitable user interface or screen, to map the area manually for future use of the automated VaPA feature. If the user agrees, the ADAS will provide explicit instructions through the user interface and guide the user through the following process.

The user of the vehicle drives to the designated drop-off location 100 which is the area where the user wants to leave the vehicle before sending off the vehicle to park autonomously.

The user confirms start of training mode, or, respectively, mapping of the car park, in order to provide digital map information for the VaPA feature.

The user is prompted to manually drive along the parking route 300 that the vehicle will use later on for searching a parking location.

Upon arrival at the pick-up location 200 which is the area to which the user wants to summon the vehicle to at a later point in time, the user stops the vehicle.

The user confirms end of training mode or, respectively, mapping.

Without any further interaction required by the user, the vehicle's ADAS, based on the vehicle sensor data acquired during training mode, generates, and stores the trained digital map for further use in the autonomous driving mode.

When the user then prompts the autonomous driving system to valet park the vehicle, the ADAS uses the trained digital map to navigate along the parking route 300, scanning the areas adjacent of the parking route 300 for a suitable parking location using vehicle sensor apparatus like cameras, Lidar, radar, ultrasonic or proximity sensors. Once such a parking location has been identified, the autonomous driving system valet parks the vehicle.

Principally the vehicle might not be able to instantly find a parking location during a VaPA drop-off manoeuvre because the parking lot is full. By adding the condition to the training process that the drop-off location 100 and the pickup location 200 and vehicle heading must be the same, a closed route as shown in FIG. 1 is guaranteed to be created. In the method according to the invention, this allows the vehicle to do additional search loops in case no suitable parking location could be found in the first loop.

Once the training mode or, in other words, the training map session is successfully performed, the user is free to post-process the trained digital map and to manually select the preferred drop-off location 100 and pickup location 200 as long as these locations are part of the parking route 300 used for the creation of the trained digital map.

The description of implementations of the inventive concepts is not intended to limit the scope of protection to these implementations. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described. The scope of protection is defined in the following claims.

The invention claimed is:

1. A method of providing a user trained map for driver assistance in a vehicle, the method comprising:

entering a training mode, wherein a driven speed of the vehicle in the training mode ranges within a pre-defined training speed limit defined to avoid negatively affecting map accuracy;

acquiring and at least temporarily storing vehicle sensor data related to a position of the vehicle while the vehicle is operating in the training mode;

generating and storing a trained digital map of a parking route at least partially based on the acquired vehicle sensor data;

acquiring and storing position information related to a drop-off location and to a pickup location, the drop-off location and the pickup location being part of the parking route; and exiting the training mode.

2. The method of claim 1, wherein the training mode receives manual steering input from a user of the vehicle.

3. The method of claim 1, wherein the vehicle sensor data includes GPS (Global Positioning System) data.

4. The method according to claim 1, further comprising:

entering an autonomous driving mode if the autonomous driving mode has not already been entered;

steering the vehicle, in the autonomous driving mode, from the drop-off location along the parking route at least partially based on the trained digital map;

identifying a parking location on the parking route; and parking the vehicle in the parking location.

5. The method according to claim 4, wherein identifying the parking location includes identifying the parking location at least partially based on vehicle sensor data, the vehicle sensor data including at least one of camera data, Lidar data, radar data, ultrasonic sensor data, and proximity sensor data.

6. The method of claim 4, comprising receiving instructions from a user to park the vehicle.

7. The method according to claim 1, comprising:

entering an autonomous driving mode if the autonomous driving mode has not already been entered; and steering the vehicle, in the autonomous driving mode, to the pickup location at least partially based on the trained digital map.

8. The method of claim 7, comprising receiving instructions from a user to move the vehicle from the parking location to the pickup location.

9. The method according to claim 1, comprising:

determining that the vehicle is entering a car park;

determining whether digital map information of the car park is available; and proposing entry into and performance of the training mode to a user of the vehicle.

10. The method according to claim 9, comprising:

determining that the digital map information of the car park is available; and confirming that the digital map information is correct by comparison of the digital map information with the trained digital map.

11. The method according to claim 10, comprising guiding the user of the vehicle in training mode along the parking route at least partially based on the digital map information.

12. The method according to claim 1, comprising: (a) post-processing the trained digital map, wherein post-processing includes refining the trained digital map using additional vehicle sensor data and/or external digital map data, the vehicle sensor data comprising at least one of camera data, Lidar data, radar data, ultrasonic sensor data, and proximity sensor data, and/or (b) making the trained digital map available to a central server computer for sharing the trained digital map with other users.

13. The method of claim 1, wherein generating and storing the trained digital map of the parking route at least partially based on the acquired vehicle sensor data includes discarding a portion of the route for which the vehicle exceeded the pre-defined training limit.

14. A computing device comprising a processor and a memory, the memory storing instructions executable by the processor, the instructions including instructions to:
communicate with a sensor apparatus of a vehicle to acquire vehicle sensor data, including Global Positioning System (GPS) data from a GPS sensor;
communicate with a data storage device for storing and providing data such as vehicle sensor data and digital map data;
enter a training mode, wherein a driven speed of the vehicle in the training mode ranges within a pre-defined training speed limit defined to avoid negatively affecting map accuracy;
acquire and at least temporarily store vehicle sensor data related to a position of the vehicle while the vehicle is operating in the training mode;
generate and store a trained digital map of a parking route at least partially based on the acquired vehicle sensor data;
acquire and store position information related to a drop-off location and to a pickup location, the drop-off location and the pickup location being part of the parking route; and
exit the training mode.

15. The computing device of claim 14, further including instructions to:
enter an autonomous driving mode if the autonomous driving mode has not already been entered;
steer the vehicle, in the autonomous driving mode, from the drop-off location along the parking route at least partially based on the trained digital map;
identify a parking location on the parking route; and
park the vehicle in the parking location.

16. The computing device of claim 15, wherein the instructions to identify a parking location include instructions to:
identify the parking location at least partially based on vehicle sensor data, the vehicle sensor data including at least one of camera data, Lidar data, radar data, ultrasonic sensor data, and proximity sensor data.

17. The computing device of claim 14, further including instructions to:
determine that the vehicle is entering a car park;
determine whether digital map information of the car park is available; and
propose entry into and performance of the training mode to a user of the vehicle.

18. The computing device of claim 17, further including instructions to:
determine that the digital map information of the car park is available; and
confirm that the digital map information is correct by comparison of the digital map information with the trained digital map.

19. The computing device of claim 14, further including instructions to generate and store the trained digital map of the parking route at least partially based on the acquired vehicle sensor data includes discarding a portion of the route for which the vehicle exceeded the pre-defined training limit.

20. An autonomous driving system for a vehicle, comprising:
a vehicle sensor apparatus including at least a Global Positioning System (GPS) sensor;
control and servo units configured to autonomously drive the vehicle, at least partially based on vehicle sensor data from the vehicle sensor apparatus;
a data storage device for storing and providing data;
a user interface; and
a computing device comprising a controller and a memory, the memory storing instructions executable by the controller, the instructions including instructions to:
communicate with a sensor apparatus of the vehicle to acquire vehicle sensor data, the sensor apparatus including Global Positioning System (GPS) data from a GPS sensor;
communicate with a data storage device for storing and providing data such as vehicle sensor data and digital map data;
enter a training mode, wherein a driven speed of the vehicle in the training mode ranges within a pre-defined training speed limit defined to avoid negatively affecting map accuracy;
acquire and at least temporarily store vehicle sensor data related to a position of the vehicle while the vehicle is operating in training mode;
generate and store a trained digital map of a parking route at least partially based on the acquired vehicle sensor data;
acquire and store position information related to a drop-off location and to a pickup location, the drop-off location and the pickup location being part of the parking route; and
exit the training mode.

* * * * *